Feb. 18, 1947.                J. M. KEMPER                    2,416,261
                              OIL COOLER CONTROL
                              Filed Feb. 6, 1943
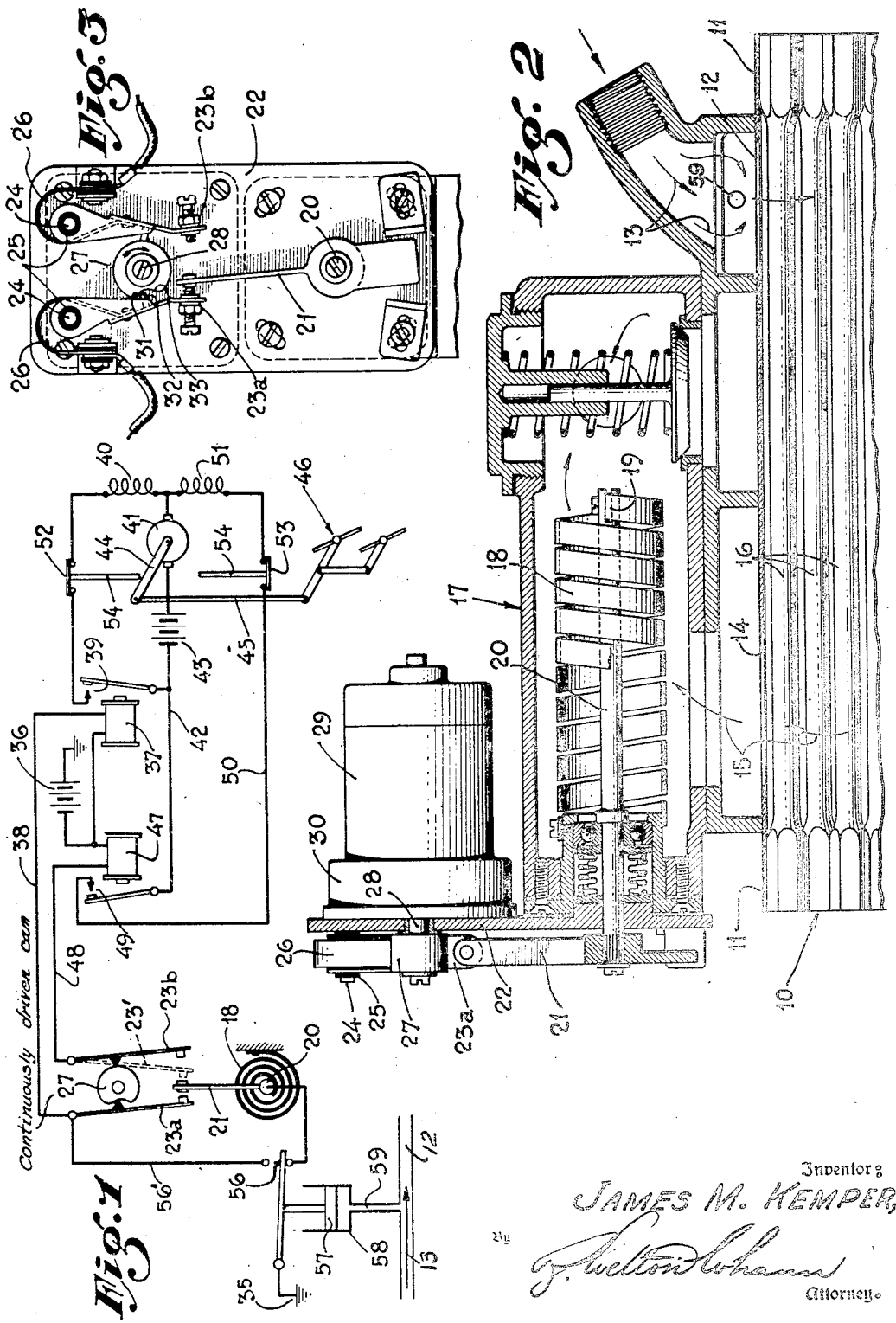
Inventor
JAMES M. KEMPER,
By
              Attorney Patented Feb. 18, 1947

2,416,261

UNITED STATES PATENT OFFICE 2,416,261

OIL COOLER CONTROL

James M. Kemper, Hollywood, Calif., assignor to The Garrett Corporation, Airesearch Manufacturing Company, division, Los Angeles, Calif., a corporation of California Application February 6, 1943, Serial No. 474,995

1 Claim. (Cl. 236—35)

My invention relates in general to heat regulating devices, and relates in particular to control means for devices wherein the heat content of a medium, such as oil, for example, is changed by transmission of heat from one area to another.

Although the invention is of general utility as a control for heat transmitting devices, it is of especial utility with oil coolers of the type employed to change the heat content of the lubricating oil employed in aircraft engines; therefore, the invention will be explained in detail with reference to this preferred use of the invention.

It is an object of the invention to provide a control device which will operate with a minimum of "hunting." This term, as used herein, means that condition in a control device wherein the control part, such as a valve, is constantly moving back and forth as though seeking or hunting for a place of rest. The rate of heat dissipation in an oil cooler depends upon a number of factors, one of which is the velocity or quantity of air flow through the air tubes of the cooler. It is a function of control devices used with coolers to vary the air flow as the heat absorbing requirements of the cooler change. That is to say, if the oil issuing from the cooler is at too low a temperature, due to the fact that too much heat is being extracted from the oil as it passes through the cooler, the air flow is diminished, or, on the other hand, if the temperature of the oil issuing from the cooler increases above a predetermined value, it is a function of the oil cooler control to increase the flow of air through the air tubes of the cooler. A change in the air flow does not produce an immediate change in the temperature of the oil due to an inherent lag in the characteristics of the cooler resulting from the fact that the dissipation of heat from the oil in the shell is not directly to the air, but consists first in absorption of heat from the cooler tubes by the air so that the metal walls of these tubes will then have capacity for absorption of heat from the oil. This lag results in the effect called hunting.

It is an object of the present invention to provide an oil cooler control having a simple means for producing periods of rest in the action of the control to compensate for the lag in the response of the cooler to changes in air flow, thereby minimizing the hunting action of the control.

It is a further object of the invention to provide an oil cooler control in which the movement of the air controlling element in response to a change in temperature of the oil corresponds relatively closely to the change in air flow required to offset the increase in temperature of the oil.

It is an object of the invention to provide a control for a device for changing the heat content of a medium, which device has means to vary the action of the means for changing the heat content of the medium, which is under control of a thermostat and associated switch parts which are given relative movement by the thermostat and which are provided with an additional relative movement of reciprocating character so that these switch parts will be periodically disengaged even though the condition of the thermostat due to its temperature received from the medium might be such as to normally hold the switch parts in engagement.

A further object of the invention is to provide a device of the character set forth in the preceding paragraph wherein one of the switch parts is moved back and forth by the thermostat in accordance with temperature changes, and the other of the switch parts is moved continuously with a reciprocating motion through a prescribed range of movement.

A further object of the invention is to provide a control device having a switch part movable in opposite directions from a central position so as to engage contacts disposed on opposite sides thereof, and cam means for reciprocating these laterally disposed contacts.

Further objects and advantages of the invention will be brought out in the following part of the specification.

Referring to the drawing which is for illustrative purposes only,

Fig. 1 is a schematic view showing an embodiment of my invention.

Fig. 2 is a fragmentary sectional view showing the manner in which the control unit may be applied to a heat changing device, specifically an oil cooler.

Fig. 3 is a view looking toward the left end of Fig. 2.

In Fig. 2 I have shown a heat changing device 10 which is in fact an oil cooler having a shell 11 with an inlet 12 through which oil passes as indicated by arrows 13 and an outlet 14 through which the cooled oil makes its exit as indicated by arrows 15. Within the shell 11 there are tubes 16 forming a part of the heat varying means of the device 10. A fluid having capacity for heat is passed through these tubes 16. Such fluid in an oil cooler is preferably air. Whether the oil which engages the tubes 16 is heated or cooled will depend upon the relative temperature of the air which passes through the tubes 16. In other words, the change in the heat content of the medium comprising the oil depends upon whether air which passes through the tubes 16 is hotter or cooler than the oil which is brought into contact with the external surfaces of the tubes while passing through the interior of the shell 11. It is of course a function of the oil cooler to reduce the temperature of the oil which passes therethrough, but it will be recognized that the control means to be hereinafter described will function with a heat changing device adapted to either increase the heat content of a medium or to decrease the heat content thereof.

From the outlet 14 the oil passes into a casing 17 wherein a portion of the oil is brought into contact with a thermostat 18 comprising a helix of bimetallic thermostat stock having its free end 19 connected to a rotatable shaft 20 having a switch part 21 connected to its outer end.

A supporting plate 22 is disposed in a position to be traversed by the switch member 21. Switch parts 23, specifically designated as switch parts 23a and 23b, are disposed on opposite sides of the swinging portion of the switch part 21 and are supported for swinging movement on pins 24 surrounded by insulator bushings 25. Springs 26 urge the switch parts toward a cam 27 which is supported on a shaft 28 which is rotated at relatively slow speed by motor means which may consist of a small motor 29 and a reducing gear 30, details of which are not shown for the reason that motors with built in reducing gears are old and well known in the various mechanical arts.

The switch parts 21 and 23 are shown as simple electrical contacts. Relative movement of these switch parts is produced by the thermostat 18, and a second relative movement thereof is produced by the cam 27. When the oil engaging the thermostat 18 is at a predetermined or normal temperature, the switch contact 21 will be held in a centralized position as shown in Fig. 1. As the cam 27 rotates, the contacts 23a and 23b will be reciprocated through limited arcs of movement on opposite sides of the contact 21, but will not engage the contact 21 when it is in the centralized position referred to. For example, the contact 23a in Fig. 1 is shown in the extreme position thereof permitted by the cam 27. When the cam 27 rotates through an arc of 180°, the switch contact 23a will be moved leftward and the switch contact 23b will move into the position thereof shown by dotted lines 23'. It will be seen, accordingly, that the contacts 23 will be constantly reciprocated back and forth between positions close to the centralized position of the contact 21 and positions remote from the centralized position of the contact 21, and that should the contact 21 be swung from its centralized position, it will be intermittently engaged by the contact 23a and the contact 23b, depending upon the direction in which the contact 21 is moved from its centralized position. For example, should the oil which engages the thermostat 18 drop in temperature, which drop is an indication that too much heat is being removed during the passage of the oil through the cooler, the thermostat 18 will swing the contact 21 leftward into a position such as shown in Fig. 3 wherein it may be engaged by the contact 23a. The length of time that the contact 21 will remain in engagement with the contact 23a depends upon the distance it is swung from centralized position, and this distance will correspond to or be a measure of the drop in the oil temperature from the prescribed normal value for which the control is set. For example, the cam 27 is in continuous clockwise rotation, as indicated in Fig. 3, and as the leading slope 31 of the cam 27 passes under the cam follower 32 of the contact 23a, the contact 23a will engage the contact 21 at the position of the cam 27 shown in Fig. 3. The contact 23a will remain in contact with the part 21 during the period of time required for the cam 27 to bring the following or lifting slope 33 of the cam into engagement with the follower 32 so as to lift the contact 23a from engagement with the contact 21. If there is only a slight deflection of the contact 21 from its centralized position, the period of engagement of the contact 23a therewith may endure for several seconds only, but, should there be a large deflection of the switch contact 21, its period of engagement with the contact 23a may continue through ten or twenty seconds.

As shown in Fig. 1, the contact 21 is connected through a switch 56 with a ground 35 so as to be electrically connected to a power source indicated as a ground battery 36. Should the contact 21 engage the contact 23a, a relay 37 will be energized through a conductor 38. This relay 37 embraces a motor switch 39 which will be then closed so as to energize a winding 40 of a reversible motor 41, shown in a power circuit 42 including a battery 43. The energization of the winding 40 drives the motor 41 in clockwise direction so as to swing a lever 44 which is connected through a link 45 with a shutter or valve mechanism 46, to actuate the same toward open position. In a similar manner, should the contact 21 be moved rightward from its centralized position, so as to be engaged by the contact 23b, a relay 47 will be energized through the conductor 48 and the switch 49 of the relay 47 will be closed so as to cause a flow of current through a conductor 40 and the reverse field winding 51 of the reversible motor 41, to operate the motor 41 in counterclockwise direction whereby opening movement will be transmitted through the link 45 to the shutter or valve mechanism 46. Limit switches 52 and 53 are provided in circuit with the field windings 40 and 51 to stop the motor 41 when it has moved the lever 44 into either of its extreme positions. The limit switches 52 and 53 are shown with lift rods 54 arranged to be engaged by the lever 44 as it moves into its extreme position. The switch 56 is connected with an override means associated with the relay 37. To move the switch 56 upward from the position in which it is shown in Fig. 1, there is a piston 57 which moves in a cylinder 58 connected through a duct 59 with the inlet portion of the cooler so that when excess pressure builds up in the cooler, the piston 47 will move the switch 56 upward so as to engage the contact at the lower end of the conductor 56', thereby energizing the relay 37 and actuating the motor 41 so as to close the shutters 46. The motor 41 will be operated in clockwise direction until the lift rod 54 is engaged and the switch 52 opened, so as to break the electric circuit through the field winding 40 of the motor, which is at this time energized, thereby stopping the motor when the shutters 46 reach closed position.

A feature of the invention is that the control provides definite periods of rest in the operation of the motor means which opens and closes the shutters, thereby allowing time for the cooler to respond to the change in the shutter position, which has been effectuated by a motor operation.

As a means of explanation, it may be stated that the moving contacts 23a and 23b periodically check or determine the position of the thermostat contact 21 and whenever the contact 21 is found to be out of its centralized position, the control will make a slight adjustment of the shutters 46 to compensate for the fault in the temperature of the oil which has caused the thermostat 18 to move the switch member 21 from its centralized position. A period of time will elapse before the cam 27 has made a complete revolution and during this period of time, the change in the shutter position may have effected a change in the temperature of the oil to correct the fault and to return the thermostat switch contact 21 to its centralized position. On the other hand, the change in the shutter position may not have been sufficient to correct the fault in the oil temperature, with the result that upon the succeeding revolution of the cam 27, the reciprocating switch contact will again engage the contact 21 to produce a further small actuation of the motor 41 to further move the shutters 46. In this way a constant excess hunting movement of the shutters is avoided.

If there is a small change in the temperature of the oil from a prescribed normal value, there is a corresponding new position of adjustment of the shutters 46 to compensate for this change in oil temperature. In previous controls with which the applicant is familiar, the action of the thermostat does not produce this exact adjustment of the shutters to compensate for a particular change in oil temperature, but will cause the shutters to move far beyond the proper position thereof. In other words, the action of the thermostat is ordinarily to over-compensate so that the shutters are kept constantly moving toward opened and then closed positions. In the present invention the introduction of the period of delay in the operation of the control substantially avoids this over-compensation and therefore maintains the oil which leaves the cooler at a temperature very close to a value for which the control is set.

I claim as my invention:

In a control for an oil cooler having means for bringing the oil into heat exchange relation to a flow of cooling medium, the combination of: partially adjustable shutter means operable to vary the flow of said cooling medium; periodically operable motor means to actuate said shutter means toward open position or toward closed position; a thermostat exposed to changes in temperature of said oil; a switch part moved back and forth from a central position of predetermined temperature by said thermostat; a second switch part disposed in a position to be engaged by said first switch part when it is moved in one direction from said central position; a third switch part disposed so as to be engaged by said first switch part when it is moved in another direction from said central position; continuously rotatable means between said second and third switch parts and having means to effect reciprocation of the second and third switch parts alternately toward said first switch part upon each revolution; an operative connection between said switch parts and said motor means whereby changes from the predetermined temperature will impart movement to the first switch part for cooperative engagement with the second or third switch parts thereby effecting operation of said motor means only while said second or third switch parts are in engagement with the cam means thus effecting a like partial adjustment of the shutter means, said operative connection comprising a source of electric current connected to said first switch part, a first conductor connected to said second switch part for accomplishing a shutter-closing operation of said motor when said second switch part engages said first switch part, and a second conductor connected to said third switch part for accomplishing a shutter-opening operation of said motor when said third switch part engages said first switch part; and pressure operated means connected to the inlet portion of said cooler and operating in response to a rise in pressure in said cooler to disconnect said source of electric current from said first switch part and connect said source of electric current to said first conductor so as to accomplish a shutter-closing operation of said motor.

JAMES M. KEMPER.

REFERENCES CITED

The following references are of record in the file of this patent:

UNITED STATES PATENTS

| Number | Name | Date |
|---|---|---|
| 479,849 | Shepherd | Aug. 2, 1892 |
| 1,420,838 | Swift | June 20, 1922 |
| 2,019,945 | Wells | Nov. 5, 1935 |
| Re. 21,777 | Kimball | Apr. 22, 1941 |
| 1,743,545 | Helpbringer | Jan. 14, 1930 |
| 1,979,810 | Petersen | Nov. 6, 1934 |
| 2,209,566 | Hornung | July 30, 1940 |
| 2,220,028 | Smith | Oct. 29, 1940 |
| 2,291,607 | Chausson | Aug. 4, 1942 |
| 1,420,348 | Swift | June 20, 1922 |
| 1,835,307 | Johnson | Dec. 8, 1931 |
| 2,314,937 | Hannon | Mar. 30, 1943 |
| 2,333,066 | Yeida | Oct. 26, 1943 |
| 2,348,212 | Gill | May 9, 1944 |
| 2,134,257 | Leutwiler | Oct. 25, 1938 |
| 1,835,907 | Shiland | Dec. 8, 1931 |
| 2,029,150 | Bear | Jan. 28, 1936 |
| 2,108,601 | Leutwiler | Feb. 15, 1938 |

FOREIGN PATENTS

| Number | Country | Date |
|---|---|---|
| 491,933 | British --- Filed | Apr. 18, 1942 / Sept. 12, 1938 |

OTHER REFERENCES

Fairchild, pages 305 and 317 of article entitled "Note on the Throttling of Electric Heat" by C. Owen Fairchild in Instruments Magazine, December 1937, published by The Instruments Publishing Co., Pittsburgh, Pa.

Certificate of Correction

Patent No. 2,416,261. February 18, 1947

JAMES M. KEMPER

It is hereby certified that error appears in the printed specification of the above numbered patent requiring correction as follows: Column 6, line 37, for the number "1,420,838" read *1,420,348*; and that the said Letters Patent should be read with this correction therein that the same may conform to the record of the case in the Patent Office.

Signed and sealed this 6th day of May, A. D. 1947.

[SEAL]

LESLIE FRAZER,
*First Assistant Commissioner of Patents.*